(12) United States Patent
Krasnansky

(10) Patent No.: US 7,389,446 B2
(45) Date of Patent: Jun. 17, 2008

(54) METHOD TO REDUCE SOFT ERROR RATE IN SEMICONDUCTOR MEMORY

(75) Inventor: Keith Krasnansky, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 704 days.

(21) Appl. No.: 10/919,212

(22) Filed: Aug. 16, 2004

(65) Prior Publication Data

US 2006/0036913 A1 Feb. 16, 2006

(51) Int. Cl.
*G06F 11/00* (2006.01)
(52) U.S. Cl. ...................................... 714/42
(58) Field of Classification Search ............ 714/42
See application file for complete search history.

(56) References Cited

U.S. PATENT DOCUMENTS 5,893,919 A * 4/1999 Sarkozy et al. .............. 711/114

2003/0088813 A1* 5/2003 McClellan et al. ............ 714/42
2006/0253733 A1* 11/2006 Galipeau et al. ................ 714/6

* cited by examiner

*Primary Examiner*—Michael C Maskulinski
(74) *Attorney, Agent, or Firm*—Steven A. Shaw; W. James Brady; Frederick J. Telecky, Jr.

(57) ABSTRACT

A method for reducing soft error rates in semiconductor memory. In one embodiment, memory is partitioned into a) boot and download memory, b) program memory and c) data memory. Each partition receives protection according to the importance of the data stored. The boot memory is protected by sensing errors and repairing them utilizing on-chip data storage redundancy and exchange. The program memory is protected by sensing errors and repairing damaged data by reloading it using the program stored in the boot and download memory. The data memory is selectively protected similar to the program memory, but with the added feature of regular saving to disk from which to check for accurate data in the event of corruption. In another embodiment, any or all of the soft error protection features are selectable on a global basis, a memory type basis or, in the cases of program and data memory, on a block level basis.

13 Claims, 4 Drawing Sheets

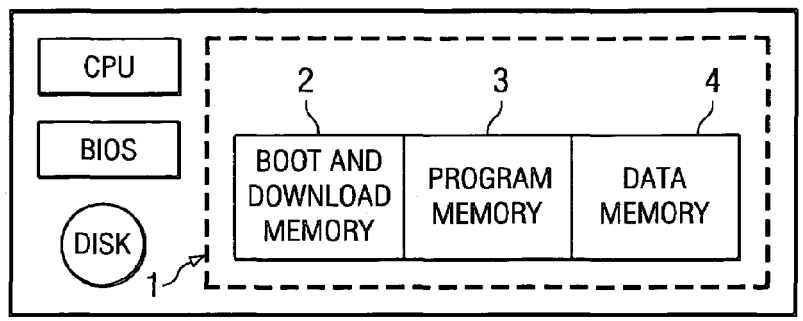
FIG. 1
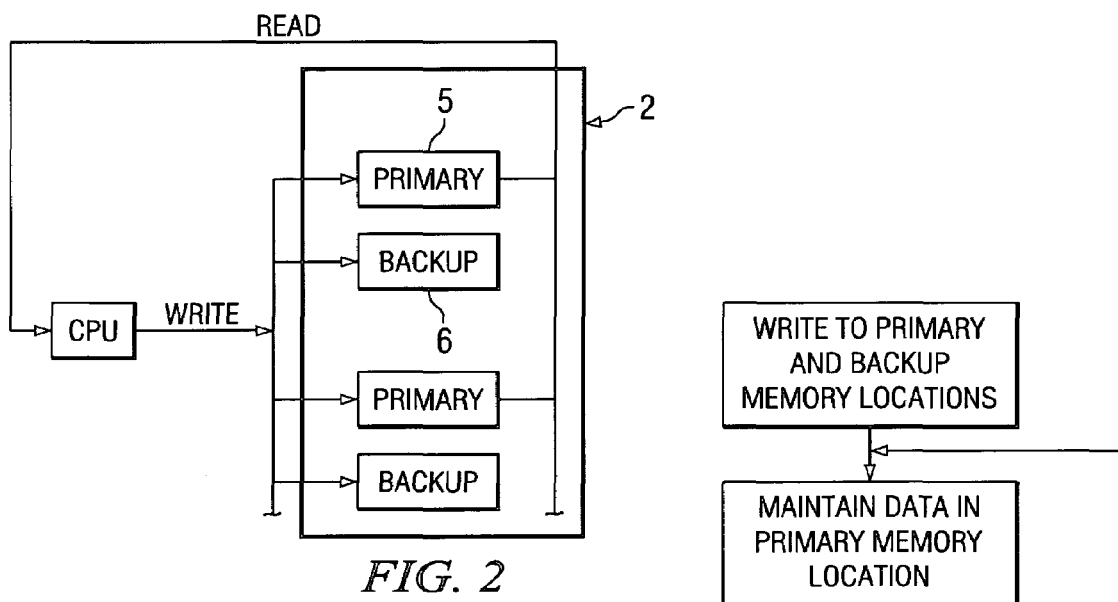
FIG. 2
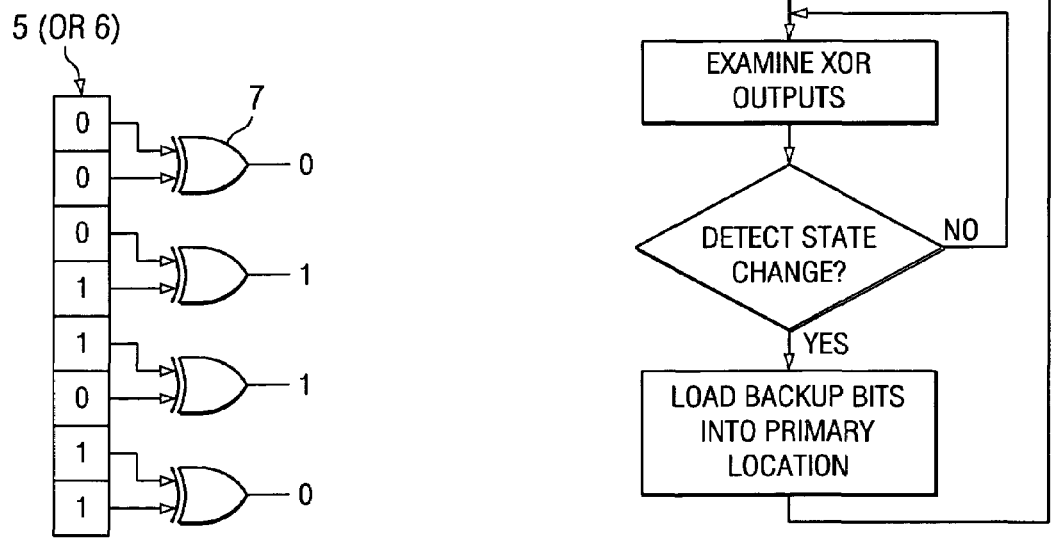
FIG. 3
FIG. 4

METHOD TO REDUCE SOFT ERROR RATE IN SEMICONDUCTOR MEMORY

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to the field of semiconductor memory protection. More specifically, the present invention is a method to reduce the soft error rate in semiconductor memory.

BACKGROUND OF THE INVENTION

A variety of sources of radiation and high-energy particles can cause a bit to change in a memory device. These changes are referred to as "soft errors". If these errors occur in program memory, it can result in a catastrophic failure that may cause the entire system to be rebooted. Such failures in telecommunications systems can result in dropped calls. Failures in medical or military equipment can be life threatening. In many systems, it is desirable to reduce failures due to soft errors to an absolute minimum in order to minimize the overall failure rate of the system.

The internal memory of processor chips is particularly vulnerable to soft errors since parity and ECC is typically not used for internal memory accesses which need to be made as quickly as possible. As internal core voltages decrease and internal processor memory increases, systems will become more vulnerable to these soft errors.

Presently the problem of soft errors is addressed by detecting system crashes with watchdog timers or status messaging and then rebooting the system as soon as possible while rerouting ongoing processes through redundant systems. This is not a satisfactory solution since data can be lost during the process of switching to the redundant system and system level redundancy is very expensive.

In addition, many telecommunications applications do not require 100% data integrity, while medical or military applications do require 100% data integrity. Therefore, a system of protection is demanded that meets the varying needs of the users.

The present invention comprises a method of soft error data protection wherein the internal processor memory is divided into three partitions: the Boot and Download Memory, the regular Program Memory and the Data Memory. Each partition receives a different type of protection according to the data's relative importance.

SUMMARY OF THE INVENTION

The present invention proposes that the internal processor memory would be divided into the following partitions:

a. Boot and Download Memory, which contains basic operating system and programs information, b. Regular Program Memory, which receives executable program data from boot and download execution, c. Data Memory, which receives and stores data generated during program execution.

Each memory partition type is enhanced with a unique data protection scheme. Each scheme's approach is appropriate for the level of protection required relative to the importance of the memory type.

The boot and download program memory receives the highest level of protection including 100% redundancy on a word-by-word basis. All of the boot and download data is stored in a primary location and is duplicated into a back-up location within the chip. As a result, the data uses more memory area per protected bit, but such data is generally limited in volume and has relatively small memory requirements. The bits in both locations are constantly monitored for errors. Errors detected in a primary word location are repaired by exchanging data from the back-up word to the corrupted primary word and the protection works vice-versa for corrupted back-up word data.

The regular program memory area is grouped in blocks where data are stored without on-chip redundancy. The chip is also constantly monitored for bit errors at these locations. When detected, errors generate a non-maskable interrupt that forces the program to jump to the highly protected boot and download memory which then reloads the affected program data into the affected block of program memory.

The data memory information is also stored without on-chip redundancy and is constantly monitored for errors. However, depending on the application, the protection for this memory may be turned on or off. When off, bit error detection will not generate an interrupt to the processor thus not slowing the program unnecessarily.

Use of this invention provides the advantage of achieving a significant reduction in the Soft Error Rate (SER) of the processor integrated circuit chip resulting in a tremendous increase in the reliability of the system while minimizing the increase in cost and area used for the memory array by only applying redundancy to the Boot and Download Memory.

BRIEF DESCRIPTION OF THE DRAWINGS

Exemplary embodiments of the invention are discussed hereinafter in reference to the following drawings, in which:

FIG. 1 is a block diagram showing the partitioning of the processor memory into Boot and Download, Program and Data locations.

FIG. 2 shows a section of the Boot and Download memory location with predefined size Primary and Backup storage areas. It indicates write operations to both storage areas and read operations from only the Primary storage area.

FIG. 3 is a schematic representation of an exemplary embodiment of the error detection method utilizing exclusive-OR gates to indicate a change in status of any bit in a primary or backup word stored within the Boot and Download storage area.

FIG. 4 is a flow diagram indicating the method of error detection and correction for the Boot and Download Memory storage locations.

DETAILED DESCRIPTION OF PREFERRED EXEMPLARY EMBODIMENTS

Figure 5:
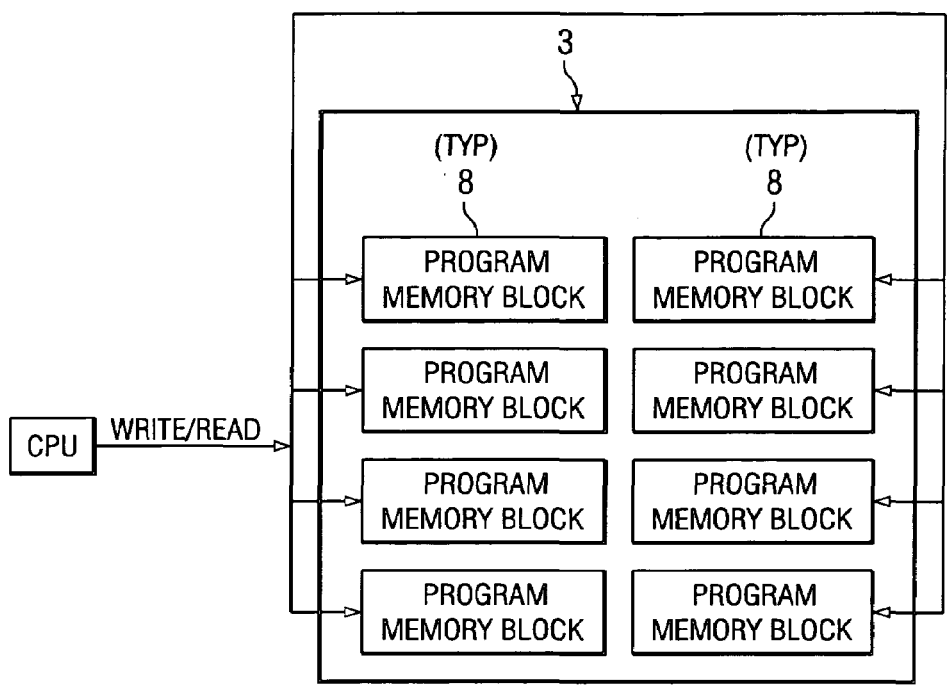
FIG. 5 shows a section of the Program Memory location divided into predefined size storage blocks. It indicates both write and read operations to and from the Program storage blocks.

As is illustrated symbolically in FIG. 1, one embodiment of the present invention comprises computer processor memory (1) that has been divided into three dedicated partitions. These are the boot and download memory partition (2), the program memory partition (3) and the data memory partition (4).

In the boot and download memory area (2), each data word exists in two memory locations, a primary word location (5) and a backup word location (6). As illustrated in FIG. 2, when writing to the boot and download memory area, data is written simultaneously to both the primary and the backup location. When data is accessed from any location in this area, only the primary location data is read.

As is illustrated schematically in FIG. 3, the bits of each primary storage word (an example of such word is shown as 0, 0, 0, 1, 1, 0, 1, 1) are exclusive-OR'ed together such that a change in state of any of the bits will cause a change in state of the exclusive-OR gate (7). If such a change in state is detected when the location is not actively being accessed during a write operation, a "soft error" has occurred. When this happens, as is shown in FIG. 4, the contents of the associated backup bits are loaded into the faulty primary bits locations. A similar mechanism is used to detect a change in state of any of the bits in the backup word location (6). If such a change in state is detected when the location is not actively being accessed during a write operation, the contents of the associated primary bits is loaded into the backup locations. Once these memory areas are originally loaded, it is unlikely that further write operations will be performed to any of the locations.

The probability that a bit change would occur in the primary and backup word locations (5 and 6) simultaneously is considered negligible, and in the exemplary embodiment described above, protection against such an occurrence is not indicated. However, the addition of logic circuitry to protect against any number of simultaneous bit errors may be included without departing from the teachings of the present invention.

Figure 6:
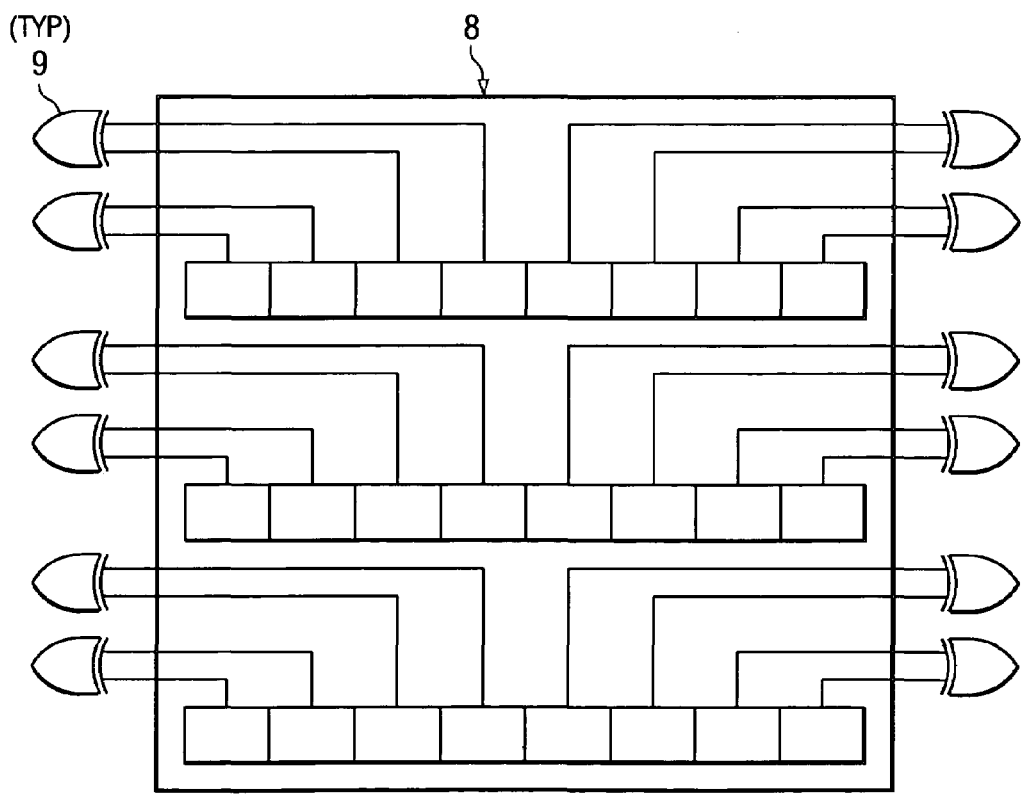
FIG. 6 is a schematic representation of an exemplary embodiment of the error detection method utilizing exclusive-OR gates to indicate a change in status of any bit in a word within a Program Memory storage block.
Figure 7:
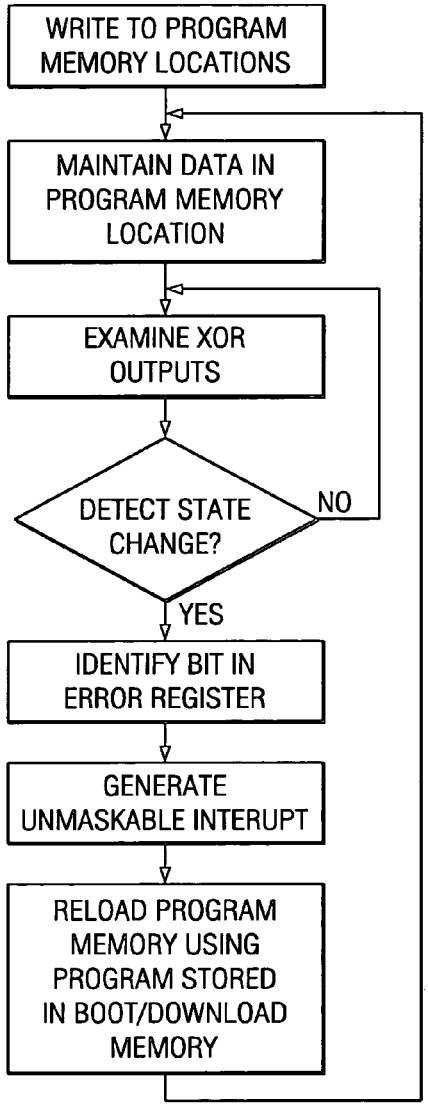
FIG. 7 is a flow diagram indicating the method of error detection and correction for the Program Memory storage locations.

As is illustrated in FIG. 5, the program memory (3) is grouped together in blocks (8) of predefined size where all of the bits of the block are exclusive-OR'ed together as shown in FIG. 6 such that a change in state of any of the bits in the memory block will cause a change in state of the exclusive-OR gate (9). As illustrated in FIG. 7, if such a change in state is detected when any of the memory block locations are not actively being accessed during a write operation, then a non-maskable interrupt is generated to the processor and a bit is set in an error register to identify the program memory block (8) with the corrupted bit. The program is then forced to jump to the highly protected boot and download memory (2) which subsequently reloads the affected program data into the affected block of program memory. Once this memory area is originally loaded, it is unlikely that further write operations will be performed to any of the locations.

The probability that a bit change would occur simultaneously in bits in more than one program memory block (8) is considered negligible and minimizing the size of the memory blocks will also reduce this probability. In the exemplary embodiment described above, protection against a simultaneous occurrence is not indicated. However, the addition of logic circuitry to protect against any number of simultaneous bit errors may be included without departing from the teachings of the present invention.

Figure 10:
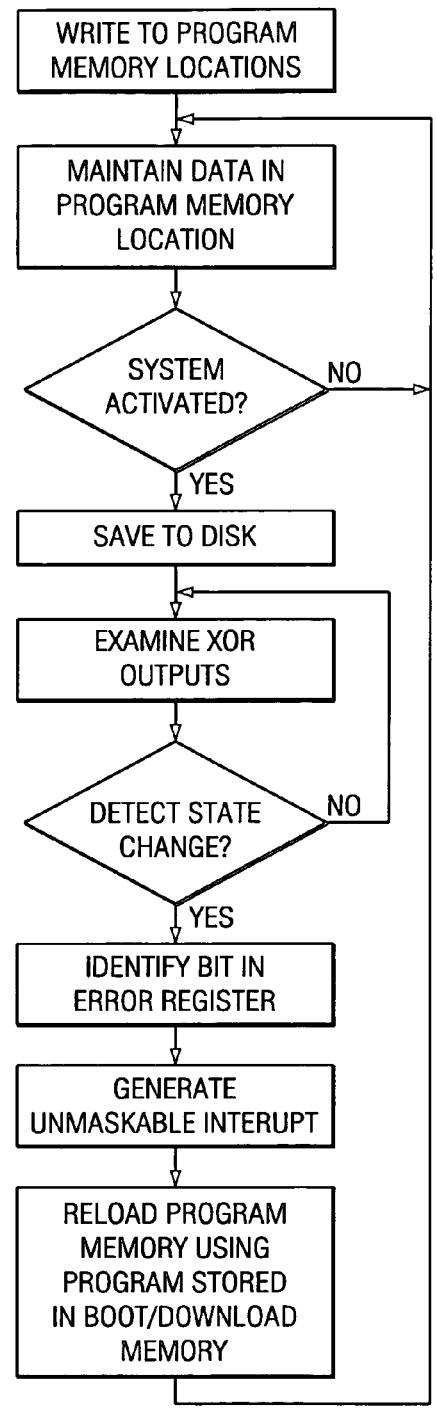
FIG. 10 is a flow diagram indicating the method of error detection and correction for the Data Memory storage locations.
Figure 8:
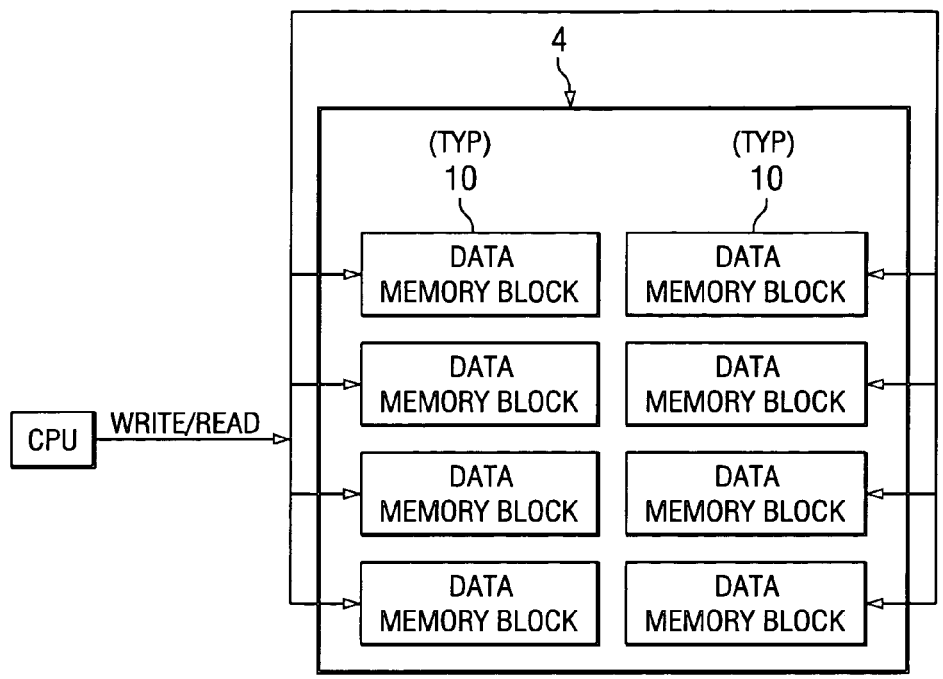
FIG. 8 shows a section of the Data Memory location divided into predefined size storage blocks. It indicates both write and read operations to and from the Data storage blocks.
Figure 9:
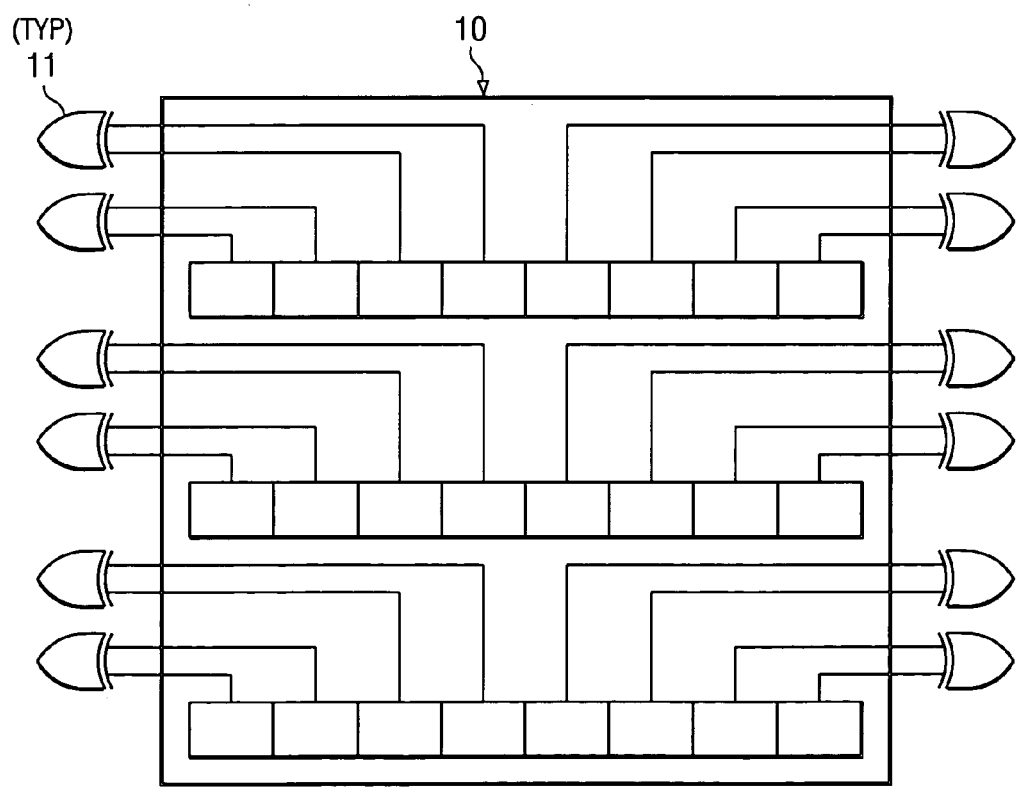
FIG. 9 is a schematic representation of an exemplary embodiment of the error detection method utilizing exclusive-OR gates to indicate a change in status of any bit in a word within a Data Memory storage block.

As is illustrated in FIG. 8, the data memory (4) is also grouped together in blocks (10) of predefined size where all of the bits of the block are exclusive-OR'ed together as shown in FIG. 9 such that a change in state of any of the bits in the memory block will cause a change in state of the exclusive-OR gate (11). At the option of the user, as shown in FIG. 10, data is saved at regular and frequent intervals. Then, if such a change in state is detected when any of the memory block locations are not actively being accessed during a write operation, a non-maskable interrupt is generated to the processor and a bit is set in an error register to identify the data memory block (10) with the corrupted bit. Then a search is performed to detect if the corrupted bit had been stored on external memory prior to corruption. If so, the bit from external memory is reloaded into the associated data memory block area. If the data bit had not been saved to external memory, the program then alerts the user as to the nature of the data loss.

The data memory (4) will incur a significant number of write accesses, so it would be beneficial to minimize its block size. In this way a minimum number of bits are exposed to accidental state changes which may occur coincident with any write operation to any block in this memory area.

The probability that a bit change would occur simultaneously in more than one bit of the data memory block (4) is considered negligible and minimizing the size of the memory blocks (10) will also reduce this probability. In the exemplary embodiment described above, protection against a simultaneous occurrence is not indicated. However, the addition of logic circuitry to protect against any number of simultaneous bit errors may be included without departing from the teachings of the present invention.

In a second exemplary embodiment of the invention, any or all of the exclusive-OR'ed interrupts would be enabled or disabled by the user on either a global basis, memory type basis or, in the cases of program and data memory only, on a block level basis.

The above descriptions depict the use of exclusive-OR gates as the method of detection of bit errors in the storage locations. However, any method of error detection may be employed within the inventive concept herein taught.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A method of soft error rate reduction comprising:
   partitioning a computer processor memory into three dedicated partitions, such partitioning being commensurate with an importance of data contained therein, said partitioning comprising:

a boot and download memory location which stores operation-critical information obtained from a BIOS or other locations;

a program memory location which stores at least one program loaded from the boot and download memory or from the permanent storage;

a data memory location which contains the data generated from the at least one program;

monitoring a plurality of data bits within said partitions for accidental changes of state (soft errors); and a means of error recovery for each of said partitions, such means being commensurate with the importance of data contained therein.

2. The method of claim 1 wherein said partitioning further comprises:

separating said boot and download memory locations into primary and secondary storage locations;

separating said program memory locations into a plurality of program memory blocks of a predefined size; and separating said data memory locations into a plurality of data storage blocks of predefined size.

3. The method of claim 2 wherein said partitioning further comprises:

integrating circuitry to write to both primary and secondary storage locations;

integrating circuitry to read only from said primary storage locations; and minimizing said data storage block size of claim 3 to limit data exposure to accidental state changes which may occur coincident with any write operation to said blocks.

4. The method of claim 1 wherein said monitoring comprises:

connecting a plurality of exclusive-OR gates to all bit locations within each partition such that an accidental change of state (soft error) in any of the bits in any memory location may be detected as a change of state in an output of the affected exclusive-OR gate;

a means of identifying the location of said soft errors; and selectively implemented regular and frequent saving of data from the petitioned data storage location to an external memory device.

5. The method of claim 1 wherein said means of error recovery within said boot and download memory location comprises:

having the program jump to replace data corrupted within a primary storage location with the corresponding non-corrupted data from its associated backup location.

6. The method of claim 1 wherein said means of error recovery within said program memory location comprises:

identifying the location of the corrupted bit in an error register;

generating a non-maskable interrupt to the processor; and having the program jump to reload program data corrupted within program storage block from the information contained in the boot and download storage location.

7. The method of claim 1 wherein said means of error recovery within said data memory location comprises selectively implemented:

identification of the location of the block housing the corrupted bit in an error register;

generation of a non-maskable interrupt to the processor;

performing a search to determine if the data in the affected block had been saved to an external memory device prior to corruption; and reloading of said saved data to said data memory block if the data had been stored to the external memory device prior to corruption.

8. The method of claim 1 wherein said means of error recovery within said boot and download memory location comprises:

having the program jump to replace data corrupted within a backup storage location with the corresponding non-corrupted data from its associated primary location.

9. The method of claim 1 wherein said means of error recovery within said data memory location comprises selectively implemented:

identification of the location of the block housing the corrupted bit in an error register;

generation of a non-maskable interrupt to the processor;

performing a search to determine if the data in the affected block had been saved to an external memory device prior to corruption; and alerting the user as to the nature of the data loss if said data had not been stored to the external memory device prior to corruption.

10. A processor memory comprising:

a boot and download memory location which stores operation-critical information obtained from a BIOS or other locations;

a program memory location which stores the programs loaded from the boot and download memory location or from the permanent storage;

a data memory location which contains the data generated from programs running on the computer;

monitoring a plurality of data bits within said partitions for accidental changes of state (soft errors); and a means of error recovery for each of said partitions, such means being commensurate with an importance of data contained therein.

11. The processor memory of claim 10 wherein said partitioning further comprises:

separating said boot and download memory locations into primary and secondary storage locations;

separating said program memory locations into a plurality of program memory blocks of a predefined size; and separating said data memory locations into a plurality of data storage blocks of predefined size.

12. The processor memory of claim 11 wherein said partitioning further comprises:

integrating circuitry to write to both primary and secondary storage locations;

integrating circuitry to read only from said primary storage locations; and minimizing said data storage block size to limit data exposure to accidental state changes which may occur coincident with any write operation to said blocks.

13. The processor memory of claim 10 wherein said monitoring comprises:

connecting a plurality of exclusive-OR gates to all bit locations within each partition such that an accidental change of state (soft error) in any of the bits in any memory location may be detected as a change of state in an output of the affected exclusive-OR gate;

a means of identifying the location of said soft errors; and selectively implemented regular and frequent saving of data from the petitioned data storage location to an external memory device.

* * * * *